United States Patent [19]

Dárdai et al.

[11] 4,134,034
[45] Jan. 9, 1979

[54] MAGNETOHYDRODYNAMIC POWER SYSTEMS

[75] Inventors: Pál Dárdai; Ferenc Meckl; József Papp, all of Tatabanya; Elémer Varga, Budapest, all of Hungary

[73] Assignee: Banyaszati Kutato Intezet, Budapest, Hungary

[21] Appl. No.: 775,996

[22] Filed: Mar. 9, 1977

[51] Int. Cl.² ............................................. H02N 4/02
[52] U.S. Cl. ..................................................... 310/11
[58] Field of Search .......................................... 310/11

[56] References Cited

U.S. PATENT DOCUMENTS

| 3,327,223 | 6/1967 | Halista | 310/11 X |
|---|---|---|---|
| 3,354,328 | 11/1967 | Maitland | 310/11 |
| 3,368,088 | 2/1960 | Krzycki et al. | 310/11 |
| 3,480,806 | 11/1969 | Berberich | 310/11 |
| 3,524,086 | 8/1970 | Lindley | 310/11 |
| 3,702,973 | 11/1972 | Daugherty et al. | 310/11 X |
| 3,748,505 | 7/1973 | Lauarini | 310/11 |
| 3,878,409 | 4/1975 | Gill et al. | 310/11 |
| 4,016,438 | 4/1977 | Holt | 310/11 |

Primary Examiner—Donovan F. Duggan
Attorney, Agent, or Firm—Young & Thompson

[57] ABSTRACT

In combustion fired magnetohydrodynamic power systems conventional fuels such as coal, oil, natural gas and the like are first completely burned, and then shock waves are generated in the combustion products by means of small amounts of explosives which are preferably initiated by pulsed lasers. Thus, highly ionized particles of great flow velocities are obtained which are supplied into a usual MHD generator to induce a ripple current in a load circuit at high efficiency.

7 Claims, 2 Drawing Figures

MAGNETOHYDRODYNAMIC POWER SYSTEMS

BACKGROUND OF THE INVENTION

This invention relates to magnetohydrodynamic methods and generators which supply an EMF force derived from mutual actions of conductive fluids flowing within magnetic fields. "MHD" is an abbreviation for the term magnetohydrodynamic.

More particularly, the present invention is concerned with combustion fired MHD power systems the working fluid of which consists of combustion products resulting from a combustion of chiep fuels such as coal, oil, natural gas, carbon monoxide, char and the like with an oxidant such as air. The efficiency of such MHD power systems is the greater the higher the electric conductivity of their working fluids. Conductivity, in turn, is dependent on ionization. Unfortunately, combustion temperatures of conventional combustibles are not high enough to obtain a suitable ionization of a working fluid consisting of the products of such combustion. Therefore, it has been tried to increase working fluid ionization in various manners such as by external energy, electric arc discharges, and seeding the working fluid with an alkali metal such as cesium or potassium.

Also shock waves are suitable to improve ionization since they are directional and, therefore, generate translation and dissociation terms in the direction of progress. Such means are described in British Patent specification No. 1,296,309.

Shock waves have been generated in combustors of MHD generators also by feeding them with explosives and detonating the latter periodically whereby high voltage electrical impulses in a range of 10 to 20 kilovolts could be obtained. Such MHD-generators are dealt with by Ernest H. Jager and Franz R. Thomanek in their article "Untersuchungen uber sprengstoffbetriebene MHD-Generatoren" in Vol. 25 1974 Journal of Applied Mathematics and Physics (ZAMP) pp. 47 to 54. However, explosives are relatively expensive for being used as fuels. Moreover, explosion time periods are too short for the explosive being thoroughly combusted whereby energy transformation is rendered incomplete with inevitable energy losses and low efficiency. Thus, the use of explosive fired MHD generators is, at present, economically unjustified.

The present invention is thought to be an improvement over such systems in that the principle of increasing ionization by means of shock waves is employed in connection with conventional and, thus, low cost fuels.

SUMMARY OF THE INVENTION

The invention relates to an improved combustion fired MHD power system in which shock waves are applied to combustion products resulting from combustion of conventional fuels. According to the present invention, in a method of generating electric energy magnetohydrodynamically in a combustion fired MHD power system, first a conventional fuel is combusted to combustion products, then, with combustion substantially terminated shoch waves are generated in such combustion products so as to ionize them. Eventually, the ionized combustion products are exhausted by their proper pressure and the shock waves.

The main advantage of the new MHD power system consists in permitting the use of conventional fuels such as coal, oil, natural gas, carbon monixide, char etc. since such fuels are relatively inexpensive and plentiful, and provide good possibilities for MHD power systems that are economical. Moreover, such fuels are permitted to burn completely prior to their being supplied to an MHD generator. Thus, in contrast to explosive fired MHD generators, no energy losses due to incomplete combustion will occur. It has been recognized that such combustion products may be strongly ionized by generating shock waves in them when combustion has substantially been terminated and that by means of using surprisingly small amounts of explosives which means a likewise low cost of explosive consumption. Furthermore, relatively slow combustion permits a reliable synchronisation of fuel supply, ignition, combustion, shock wave generation, combustion gases exhaust and cycle repetitions. Thus, a relatively high efficiency may be obtained as provided by calculations which permit an estimate of 30 to 40%. Such figures are due to the shock waves being directional and to their being directed so that they greatly enhance the forming of translation and dissociation terms as has been referred to above. Moreover, the shock waves will cover a path across the region of combustion several times; and longer paths mean greater possibilities for forming of translation and dissociation terms and, thus, a more effective or improved ionization.

An MHD power system suitable for carrying out the above specified method may comprise a combustor in the form of an acoustic cavity resonator to burn fuel with an oxidant. The combuster has a fuel supply inlet which may have fuel supply means connected to it. An explosive supply inlet in the combustor is connected with an explosive supply means. Explosion in the combustor is brought about by explosion initiating means connected with an explosion initiating inlet in the combustor. Combustion products withdraw from the combustor through a combustion product outlet connectable to an MHD generator. Furthermore, the combustor is provided with sensing means having a signal output. The sensing means serves for sensing one or more parameters of the combustion which takes place in the combustor. Dependent on sensed values the sensing means develops signals which are received by a control signal input of a control unit. The control unit controls the operation of various parts of the MHD power system in a well defined sequence. More particularly, the fuel supply means, the explosive supply means and the explosion initiating means are operated in such manner that, first, a predetermined amount of fuel is completely burnt whereafter a relatively small amount of explosive is supplied and initiated. For such purpose, the signal output of the sensing means is connected to the control signal input of the control unit.

Preferably, the walls of the cavity resonator are in the form of paraboloids which face each other with their concave sides and cause shock waves to travel repeatedly across the combustion chamber of the combustor. This means an increased length of travel and, thereby, a more vigorous forming of translation and dissociation terms with a consequent improvement of ionization. Moreover, such paraboloidal walls may have different focal distances. Then, the paraboloidal wall of smaller focal distance will lie opposite to the combustion products outlet of the combustor. Such arrangement permits that the point of intersection of the longitudinal center line of the combustor with the longitudinal center line of the explosive supply inlet be projected into the combustion product outlet of the combustor. Thereby, shock waves may withdraw from the cavity resonator without suffering noticeable damping.

BRIEF DESCRIPTION OF THE DRAWINGS

Same reference characters refer to similar details in both figures and throughout the specification and claims.

Referring to FIG. 1, reference numerals 10 and 12 designate a combustor with a combustion chamber 10a and an MHD generator, respectively.

Figure 1:
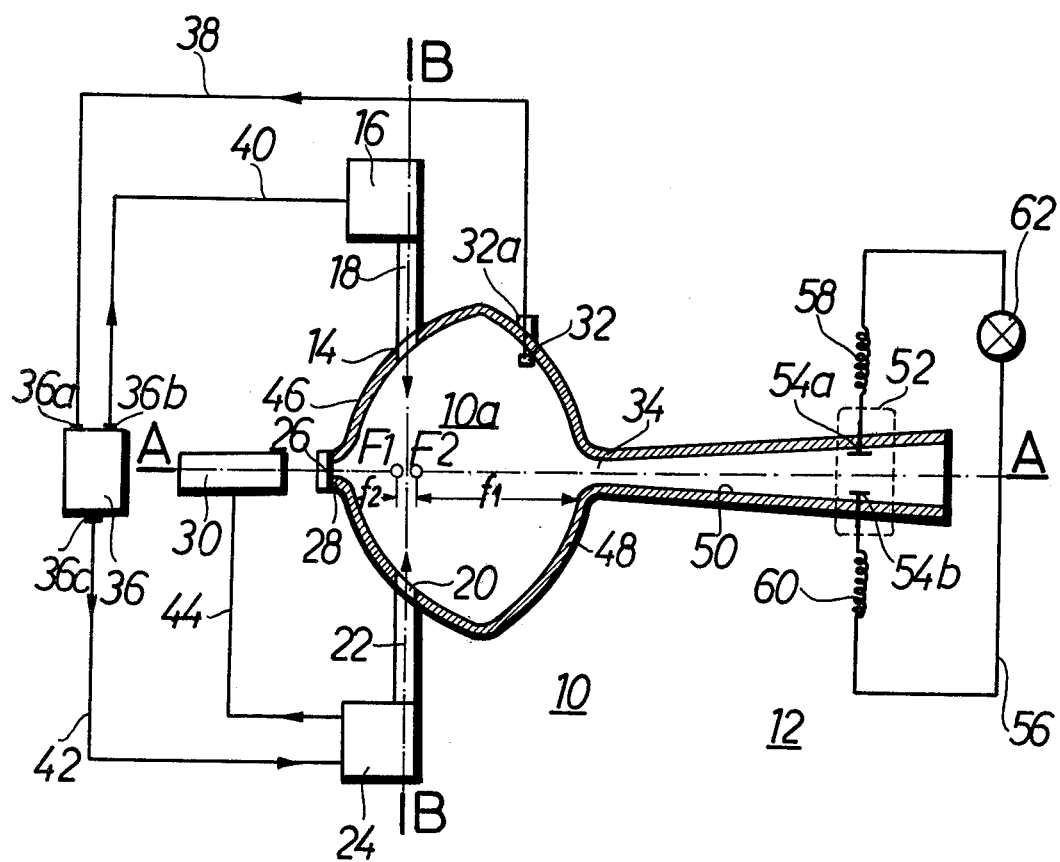
FIG. 1 is a schematic diagram of a simple MHD power system embodying the present invention.

The combustor 10 has a fuel supply inlet 14 which has a fuel supply means 16 such as fuel pump, carburetter, etc. connected to it by means of a conduit 18. Furthermore, the combustor 10 has an explosive supply inlet 20 which is connected through a conduit 22 to an explosive supply means 24, e.g. likewise a pump as in case of the fuel supply means 16. A third orifice 28 in the combustor 10 is closed by a transparent cover 26 and serves as an explosion initiating inlet 28.

Ignition of the fuel may be brought about e.g. by a plasma burner, ignition globe, spark plug or the like. Preferably, however, a pulsed laser 30 will be employed since it is suitable to initiate an explosion of the explosive supplied through explosive supply inlet 20 as well. Namely, it has been recognized that laser beams are capable of initiating explosion of liquid and solid explosives since such initiation requires 0.1 to 10 calories Joule heat and a power of 0.1 to 10 megawatts, and laser beams readily meet such requirements. Their use as exploder is particularly advantageous in the instant case because of the high accuracy as to the moment of initiating.

Reference numeral 32 designates a sensor within the combustor 10. Sensor 32 is provided for sensing at least one parameter of combustion and for developing an electric signal dependent on such parameter. A signal output of sensor 32 is referred to by reference numeral 32a.

The combustor 10 is also provided with a combustion products outlet 34 for exhausting such products from the combustor 10 into the MHD generator 12.

Reference numeral 36 designates a control unit with a control signal input 36a and a pair of control signal outputs 36b and 36c. The control signal input 36a is connected with the signal output 32a of the combustion parameter sensor 32 through path 38 while control signal outputs 36b and 36c of the control unit 36 are connected to the fuel supply means 16 and the explosive supply means 24 via paths 40 and 42, respectively.

Explosive supply means 24 is in operational connection with laser 30 through path 44.

It will be seen that, in the instant case, on the one hand, laser 30, explosion initiating inlet 28 and combustion products outlet 34 lie along a same axial center line A — A. In a similar manner, explosive supply inlet 20 lies along a center line B — B which is transverse of center line A — A. Such mutual arrangement of center lines A — A and B — B results in a readily distinguishable point of intersection the significance of which well be apparent hereinafter.

Furthermore, likewise in the instant case, combustion chamber 10a is confined by mutually opposite paraboloidal walls 46 and 48. Moreover, with the represented embodiment, the paraboloidal walls 46 and 48 have different focal distances f1 and f2 marked by focal points F1 and F2, respectively, the paraboloidal wall 46 of smaller focal distance f1 lying opposite to the outlet 34. While mutually opposite paraboloidal walls 46 and 48 are particularly suitable to focus rays reflected by them, selecting different focal distances f1 and f2 in the described manner permits projecting the point of intersection of axial lines A — A and B — B into the combustion products outlet 34 (as shown in FIG. 2) the significance of which has already been pointed out.

The MHD generator 12 is of a per se known construction. It comprises a Laval nozzle 50 a diffusor portion of which carries a magnetic lens system 52. Electrodes 54a and 54b isolated from Laval nozzle 50 lie in an electric circuit 56 comprising magnet coils 58 and 60 of the magnetic lens system 52, and a load 62.

Figure 2:
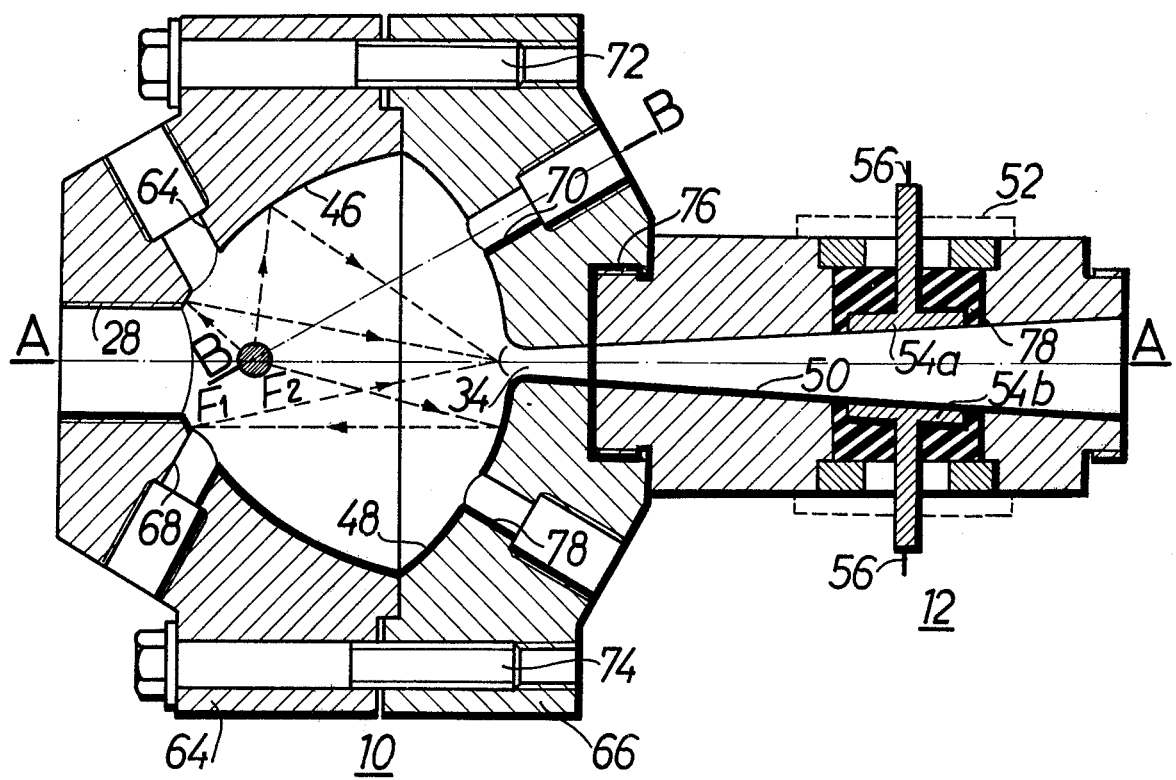
FIG. 2 is a longitudinal sectional view of the main constructional parts of an exemplified embodiment of the MHD power system shown in FIG. 1.

Constructional details of the new MHD power system are portrayed in FIG. 2. The combustor 10 comprises a pair of half casings 64 and 66 which enclose the combustion chamber 10a described above. Hole 68 serves for receiving a sensor 32 mentioned in connection with FIG. 1. Explosive inlet 20 in FIG. 1 has a duplicate in FIG. 2 in the form of a hole 70 the provision of which may be justified e.g. by reasons of easier mounting. Unemployed inlets or holes are closed e.g. by not represented plugs.

Reference numerals 72 and 74 designate screws by which half casings 64 and 66 are fixed in their mutual operative positions.

The MHD generator 12 is fixed to the combustor 10 by a threaded connection referred to by reference numeral 76. The electrodes 54a and 54b are electrically separated from the metallic body of the MHD generator by insulator 78.

In operation, fuel supply means 16 (FIG. 1) delivers fuel, e.g. petrol, Diesel oil or coal dust through conduit 18 into the combustion chamber 10a of combustor 10. Amount and moment of fuel delivery are controlled by control unit 36. Seeding the working fluid may be carried out by admixing an alkali metal such as cesium or potassium to the fuel prior to or during its delivery. Oxygen or oxygen carriers such as air may be added too.

The fuel supplied into the combustion chamber 10a will be ignited by the pulsed laser 30 in a manner known per se and completely combusted. After complete combustion has taken place and a corresponding signal has been given by sensor 32 to control unit 36, the latter triggers the explosive supply means 24 which delivers a predetermined amount of explosive through inlet 20 between focal points F1 and F2. At that moment the pulsed laser 30 which now works as an exploder sends a laser beam to the explosive in the combustion chamber 10a whereby explosion is initiated.

The explosion in the combustion chamber 10a produces a shock wave in the combustion products which travels several times between the paraboloidal walls 46 and 48, as shown in FIG. 2 by broken lines, thereby causing strong ionization of the combustion products before they are exhausted through the combustion products outlet 34 into the Laval nozzle 50.

The ionized combustion products withdraw from the combustion chamber 10a at very high flow velocities and pass through a transverse magnetic field generated by the magnetic lens system 52. By that transverse magnetic field the ionized combustion products impinge on the electrodes 54a and 54b between which they create a voltage difference. Thus, a corresponding current will flow in the electric circuit 56 and operate the load 62.

The control unit 36 ensures that the above described operational process will periodically be repeated which results in a sort of ripple current in the electric circuit 56.

It will be apparent that the invention permits building MHD generators which have a combination of all advantageous features of prior devices and methods without their drawbacks: cheap fuels may be employed and completely combusted. An overwhelming portion of useful heat energy is released from such cheap combustibles. At the same time, shock waves may be generated for ionizing, accelerating and focussing combustion products by means of small amounts of explosives and, thus, at relatively low expense. The partial processes of energy transformation follow one another in co-ordinated sequence which means ideal operational circumstances and, thereby, attainment of high efficiencies in the range of 30 to 40% as shown by calculations.

What we claim is:

1. In a method of generating electric energy magnetohydrodynamically the steps comprising:
   a. combusting a fuel material in a combustor;
   b. generating shock waves at the termination of the combustion of said fuel material in the combustion products thereof;
   c. directing said shock waves within said combustor and guiding them several times through said combustion products by reflecting them; and
   d. supplying said combustion products ionized several times by said shock waves into an MHD-generator.

2. A method as claimed in claim 1, in which said shock waves are generated by igniting an explosive introduced into said combustion products at the termination of the combustion of said fuel material.

3. A method as claimed in claim 2, and igniting said explosive by means of a laser beam.

4. A method as claimed in claim 1, and repeating periodically the previous steps.

5. In an MHD power system: an MHD generator; a combustor (10) in the form of a cavity resonator to burn fuel with oxidant and supply combustion products thereof to said generator; a fuel supply inlet (14) in said combustor; fuel supply means (16) connected to said fuel supply inlet; an explosive supply inlet (20) in said combustor; explosive supply means (24) connected to said explosive supply inlet; an explosion initiating inlet (28) in said combustor; explosion initiating means (30) connected to said explosion initiating inlet; an outlet (34) in said combustor for exhausting said combustion products to said generator; sensing means (32) with a signal output (32a) in said combustor for sensing at least one combustion parameter therein, a control unit (36) with a control signal input (36a) for operating said fuel supply means (16), said explosive supply means (24) and said explosion initiating means (30); said signal output (32a) of said sensing (32) being connected to said control signal input (36a) of said control unit (36).

6. The subject matter of claim 5 wherein: said cavity resonator (10) is confined by mutually opposite paraboloidal walls (46, 48).

7. The subject matter of claim 4 wherein: said paraboloidal walls (46, 48) have different focal distances (f1, f2), the paraboloidal wall (46) of smaller focal distance (f1) lies opposite to said outlet (34) in said combustor (10) for exhausting said combustion products to said generator and is suitable to project the point of intersection of an axial center line (A — A) of said combustor (10) with an axial center line (B — B) of said explosive supply inlet (20) into said outlet (34) of said combustor.

* * * * *